US012739201B2

(12) United States Patent
Xu et al.

(10) Patent No.: US 12,739,201 B2
(45) Date of Patent: Sep. 15, 2026

(54) DATA PACKET FORWARDING METHOD AND APPARATUS, STORAGE MEDIUM, AND ELECTRONIC DEVICE

(71) Applicant: ZTE Corporation, Shenzhen (CN)

(72) Inventors: Kai Xu, Shenzhen (CN); Liyong Cai, Shenzhen (CN); Peng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 163 days.

(21) Appl. No.: 18/853,430

(22) PCT Filed: Mar. 31, 2023

(86) PCT No.: PCT/CN2023/085687
§ 371 (c)(1),
(2) Date: Nov. 13, 2024

(87) PCT Pub. No.: WO2023/186141
PCT Pub. Date: Oct. 5, 2023

(65) Prior Publication Data
US 2025/0227063 A1 Jul. 10, 2025

(30) Foreign Application Priority Data
Apr. 2, 2022 (CN) ......................... 202210346858.8

(51) Int. Cl.
*H04L 45/74* (2022.01)
*H04L 61/2596* (2022.01)
*H04Q 11/00* (2006.01)

(52) U.S. Cl.
CPC .......... *H04L 45/74* (2013.01); *H04L 61/2596* (2013.01); *H04Q 11/00* (2013.01);
(Continued)

(58) Field of Classification Search
CPC ..... H04L 45/74; H04L 61/2596; H04Q 11/00; H04Q 2213/1301; H04Q 2213/13282
See application file for complete search history.

(56) References Cited

U.S. PATENT DOCUMENTS

2016/0112778 A1* 4/2016 Wang ................. H04Q 11/0067 398/45
2017/0180274 A1* 6/2017 Liu ......................... H04L 49/70
(Continued)

FOREIGN PATENT DOCUMENTS

CN 101860771 A 10/2010
CN 101877728 A 11/2010
(Continued)

OTHER PUBLICATIONS

European Search Report/Office Action for Application No. 23778505.0, dated Jun. 5, 2025, 88 pages.

*Primary Examiner* — El Hadji M Sall
(74) *Attorney, Agent, or Firm* — CANTOR COLBURN LLP

(57) ABSTRACT

A data packet forwarding method and apparatus, a storage medium, and an electronic device are provided. The method includes: receiving, through a Gemport in one-to-one correspondence with a service Gemport of a first edge Optical Network Unit (ONU), a data packet sent by the first edge ONU; searching for a destination forwarding port from a Media Access Control (MAC) address table according to a destination MAC address of the data packet, wherein the MAC address table stores a correspondence between a source MAC address and a Gemport; and in a case where the destination forwarding port is found, sending the data packet to a second edge ONU through the destination forwarding port. The solution may solve the problem in the related art regarding how to enable the FTTR optical gateways to
(Continued)

effectively handle data exchange between ordinary Ethernet ports and edge ONUs and data exchange between multiple edge ONUs.

20 Claims, 5 Drawing Sheets

(52) U.S. Cl.
CPC ............... *H04Q 2213/1301* (2013.01); *H04Q 2213/13282* (2013.01)

(56) References Cited

U.S. PATENT DOCUMENTS

| | | | | |
|---|---|---|---|---|
| 2018/0287942 | A1* | 10/2018 | Xie | H04L 12/4641 |
| 2019/0207783 | A1* | 7/2019 | Han | H04L 49/30 |
| 2021/0328674 | A1* | 10/2021 | Zhang | H04L 69/18 |

FOREIGN PATENT DOCUMENTS

| | | | |
|---|---|---|---|
| CN | 103209130 | A | 7/2013 |
| CN | 104506436 | A | 4/2015 |
| CN | 108260032 | A | 7/2018 |
| CN | 110391921 | A | 10/2019 |
| CN | 110958502 | A | 4/2020 |
| CN | 111491221 | A | 8/2020 |
| CN | 113727222 | A | 11/2021 |
| WO | 2009013215 | A2 | 1/2009 |

* cited by examiner

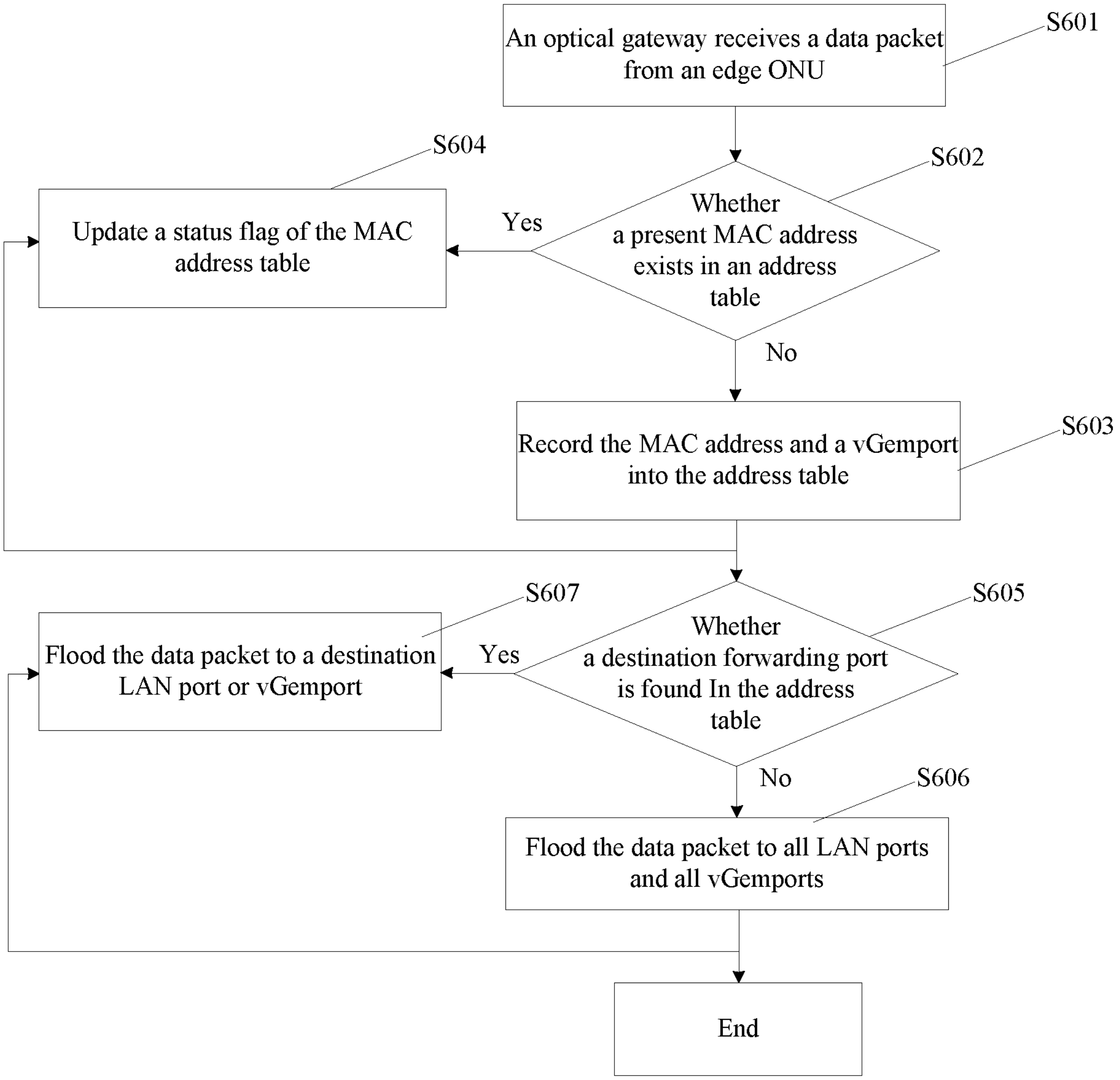

Fig. 6

An optical gateway receives a data packet from an edge ONU S601

Whether a present MAC address exists in an address table S602

Yes: Update a status flag of the MAC address table S604

No: Record the MAC address and a vGemport into the address table S603

Whether a destination forwarding port is found In the address table S605

Yes: Flood the data packet to a destination LAN port or vGemport S607

No: Flood the data packet to all LAN ports and all vGemports S606

End

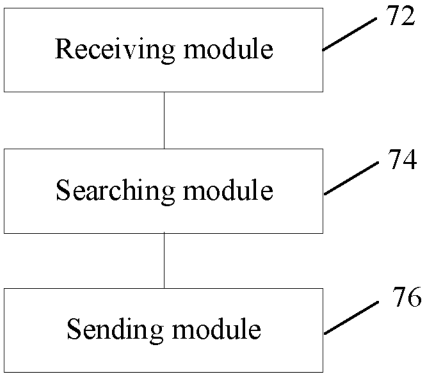

Fig. 7

DATA PACKET FORWARDING METHOD AND APPARATUS, STORAGE MEDIUM, AND ELECTRONIC DEVICE

CROSS-REFERENCE TO RELATED APPLICATION

The present disclosure is a National Stage Filing of the PCT International Application No. PCT/CN2023/085687 filed on Mar. 31, 2023, which is based on and claims priority to Chinese Patent Application CN 202210346858.8, filed on Apr. 2, 2022 and entitled "Data Packet Forwarding Method and Apparatus, Storage Medium, and Electronic Device", the disclosure of which is incorporated herein by reference in its entirety.

TECHNICAL FIELD

Embodiments of the present disclosure relate to the field of communications, and in particular, to a data packet forwarding method and apparatus, a storage medium, and an electronic device.

BACKGROUND

Due to various restrictions such as Wireless Fidelity (Wi-Fi) coverage, cable quality, and interface speeds, high-bandwidth packages chosen by users have not been fully converted into a consistent gigabit experience throughout the home. Many users consciously improve the network experience in their rooms by increasing the number of Wi-Fi hotspots, with common solutions including increasing the number of Access Points (AP) with high transmit power, Wi-Fi wireless repeaters, powerline adapters, and using Ethernet cables to connect multiple APs. These solutions can address some needs but are not optimal, and still have issues with reliability and operational maintenance.

In this case, the Fiber to the Room (FTTR) technology has emerged. Compared to traditional wired network technologies, the all-optical network solution of FTTR has significant advantages. The FTTR can directly extend optical fibers to each room and is currently the only new technology in the industry capable of achieving gigabit-plus coverage throughout the entire house.

A typical FTTR optical network generally consists of an Optical Line Terminal (OLT), an FTTR optical gateway, and edge Optical Network Units (ONUs). The FTTR optical gateway usually includes several 2.5G Ethernet ports and several 1G Ethernet ports, and further includes an expanded physical port that is used for connecting the OLT to several edge ONUs. Current ordinary optical gateways can only handle the data packet exchange of physical Ethernet ports. Compared to the ordinary optical gateways, the FTTR optical gateways need to handle the edge ONUs additionally. Therefore, how to enable the FTTR optical gateways to effectively handle data exchange between ordinary Ethernet ports and edge ONUs and data exchange between multiple edge ONUs has become an urgent problem to be solved.

Regarding the problem in the related art regarding how to enable the FTTR optical gateways to effectively handle data exchange between ordinary Ethernet ports and edge ONUs and data exchange between multiple edge ONUs, no solution has yet been proposed.

SUMMARY

The embodiments of the present disclosure provide a data packet forwarding method and apparatus, a storage medium, and an electronic device, which may at least solve the problem in the related art regarding how to enable the FTTR optical gateways to effectively handle data exchange between ordinary Ethernet ports and edge ONUs and data exchange between multiple edge ONUs.

According to an embodiment of the present disclosure, a data packet forwarding method is provided, which is applied to an optical gateway and includes:

- receiving, through a Gemport in one-to-one correspondence with a service Gemport of a first edge Optical Network Unit (ONU), a data packet sent by the first edge ONU;
- searching for a destination forwarding port from a Media Access Control (MAC) address table according to a destination MAC address of the data packet, wherein the MAC address table stores a correspondence between a source MAC address and a Gemport; and
- in a case where the destination forwarding port is found, sending the data packet to a second edge ONU through the destination forwarding port.

According to another embodiment of the present disclosure, a data packet forwarding apparatus is also provided, which is applied to an optical gateway and includes:

- a receiving module, configured to receive, through a Gemport in one-to-one correspondence with a service Gemport of a first edge Optical Network Unit (ONU), a data packet sent by the first edge ONU;
- a searching module, configured to search for a destination forwarding port from a Media Access Control (MAC) address table according to a destination MAC address of the data packet, wherein the MAC address table stores a correspondence between a source MAC address and a Gemport; and
- a sending module, configured to send the data packet to a second edge ONU through the destination forwarding port in a case where the destination forwarding port is found.

According to still another embodiment of the present disclosure, a computer-readable storage medium is also provided. The computer readable storage medium stores a computer program, wherein the computer program, when running on a processor, causes the processor to execute the operations in any one of the method embodiments.

According to yet another embodiment of the present disclosure, an electronic device is also provided, including a memory and a processor, wherein the memory stores a computer program, and the processor is configured to run the computer program so as to execute the operations in any one of the method embodiments.

BRIEF DESCRIPTION OF THE DRAWINGS

FIG. 6 is a flowchart of software data exchange in an FTTR scenario according to some embodiments of the present disclosure; and FIG. 7 is a block diagram of a data packet forwarding apparatus according to some embodiments of the present disclosure.

DETAILED DESCRIPTION

Embodiments of the present disclosure will be described below in detail with reference to the accompanying drawings and in conjunction with embodiments.

It should be noted that, terms such as "first" and "second" in the description, claims, and accompanying drawings of the present disclosure are used to distinguish similar objects, but are not necessarily used to describe a specific sequence or order.

Figure 1:
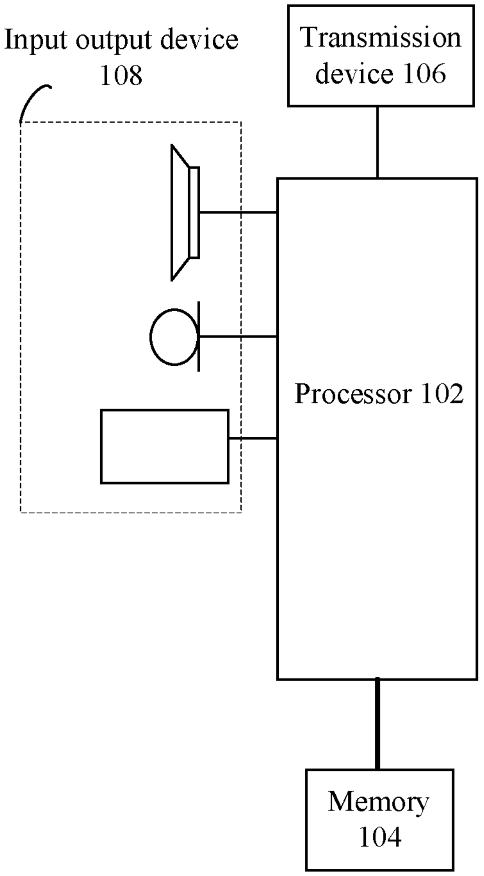
FIG. 1 is a block diagram illustrating the hardware structure of a mobile terminal of a data packet forwarding method according to some embodiments of the present disclosure.

The method embodiments provided in the embodiments of the present disclosure can be executed in a mobile terminal, a computer terminal or a similar computing device. Taking the running on the mobile terminal as an example, FIG. 1 is a block diagram illustrating the hardware structure of a mobile terminal of a data packet forwarding method according to some embodiments of the present disclosure. As shown in FIG. 1, the mobile terminal may include one or more processors 102 (only one is shown in FIG. 1) (each of the one or more processors 102 may include, but is not limited to, a processing apparatus such as a microprocessor (Micro-Controller Unit (MCU)) or a programmable logic device (Field Programmable Gate Array (FPGA)), and a memory 104 configured to store data. The mobile terminal may further include a transmission device 106 and an input/output device 108 for a communication function. Those having ordinary skill in the art may understand that the structure shown in FIG. 1 is merely exemplary, and does not limit the structure of the foregoing mobile terminal. For example, the mobile terminal may further include more or fewer components than shown in FIG. 1, or have a different configuration from that shown in FIG. 1.

The memory 104 may be configured to store a computer program, for example, a software program and a module of application software, such as a computer program corresponding to the data packet forwarding method in the embodiments of the present disclosure. The one or more processors 102 may run the computer program stored in the memory 104, so as to execute various function applications and service chain address pool slice processing, that is, to implement the foregoing method. The memory 104 may include high-speed random access memory, and may also include non-volatile memory, such as one or more magnetic storage devices, flash memory, or other non-volatile solid-state memory. In some instances, the memory 104 may further include a memory remotely located with respect to the one or more processors 102, which may be connected to mobile terminals over a network. Examples of such network include, but are not limited to, the Internet, an intranet, a local area network, a mobile communication network, and combinations thereof.

The transmission device 106 is configured to receive or transmit data via a network. Specific examples of the described network may include a wireless network provided by a communication provider of the mobile terminal. In an example, the transmission device 106 may include a Network Interface Controller (NIC) that may be coupled to other network devices via a base station to communicate with the Internet. In an example, the transmission device 106 may be a Radio Frequency (RF) module for communicating wirelessly with the Internet.

Figure 2:
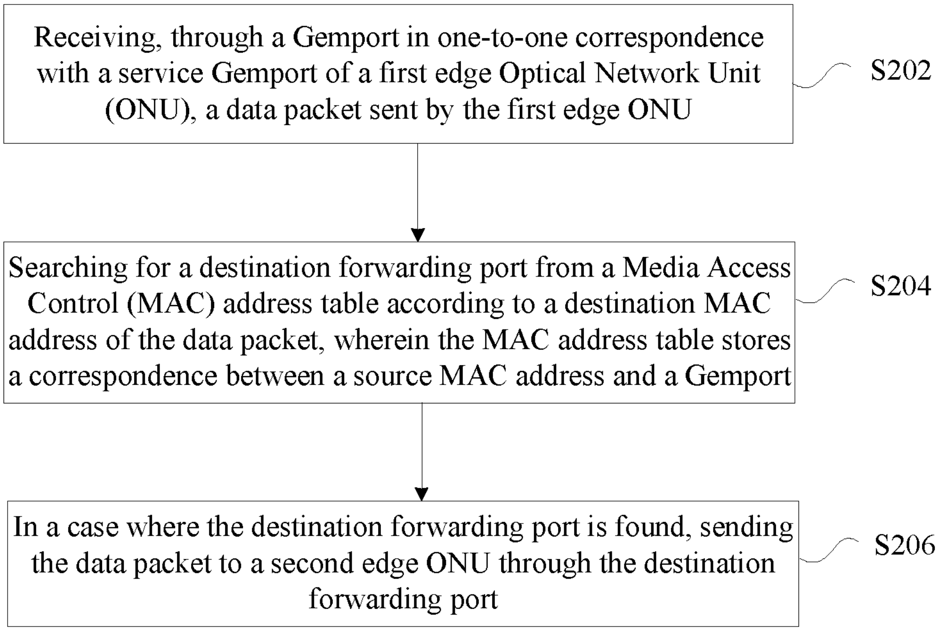
FIG. 2 is a flowchart of a data packet forwarding method according to some embodiments of the present disclosure.

A data packet forwarding method running on the described mobile terminal or network architecture is provided in the embodiments of the present disclosure. FIG. 2 is a flowchart of a data packet forwarding method according to some embodiments of the present disclosure. As shown in FIG. 2, the data packet forwarding method may be performed by an optical gateway, and the flow includes the following operations S202 to S206.

In operation S202, a data packet sent by a first edge ONU is received through a Gemport in one-to-one correspondence with a service Gemport of the first edge ONU.

In operation S204, a destination forwarding port is searched from a Media Access Control (MAC) address table according to a destination MAC address of the data packet, wherein the MAC address table stores a correspondence between a source MAC address and a Gemport.

In operation S206, in a case where the destination forwarding port is found, the data packet is sent to a second edge ONU through the destination forwarding port.

By means of the operations S202 to S206, the problem in the related art regarding how to enable the FTTR optical gateways to effectively handle data exchange between ordinary Ethernet ports and edge ONUs and data exchange between multiple edge ONUs may be solved, thereby realizing data exchange with the edge ONUs and between multiple edge ONUs.

In some embodiments of the present disclosure, the operation S204 may be implemented as follows: in a case of performing hardware processing on the data packet, the destination forwarding port is searched from a hardware MAC address table according to the destination MAC address of the data packet, wherein the hardware MAC address table stores a correspondence between the source MAC address and a pGemport; or in a case of performing software processing on the data packet, the destination forwarding port is searched from a software MAC address table according to the destination MAC address of the data packet, wherein the software MAC address table stores a correspondence between the source MAC address and a vGemport.

In some embodiments of the present disclosure, in a case where the destination forwarding port is not found, the data packet is flooded on all Local Area Network (LAN) ports and all Gemports. For example, in a case of performing hardware processing on the data packet, the data packet is sent to all the LAN ports and all the Gemports, that is, the data packet is flooded on all the LAN ports and all the Gemports; or, in a case of performing software processing on the data packet, the data packet is flooded on all the LAN ports and all vGemports.

In some embodiments of the present disclosure, after the operation S202, a source MAC address of the data packet is extracted; whether the source MAC address exists in the MAC address table is judged; and in a case where the source MAC address does not exist in the MAC address table, a correspondence between the source MAC address and the Gemport is stored into the MAC address table. In a case where the source MAC address exists in the MAC address table, status information of an entry that contains the source MAC address is updated.

In some embodiments of the present disclosure, aging processing is performed on the entry that contains the source MAC address according to the status information in the MAC address table at a preset time period.

In some embodiments of the present disclosure, before the operation S202, the data packet forwarding method may further include the following operations: after being powered on, software ports and hardware ports are created; and packet receiving functions and MAC address learning and forwarding functions of the software ports and the hardware ports are enabled, so as to complete system initialization. After the enabling, the hardware port and the software port have the MAC address learning functions and the forwarding functions.

Figure 3:
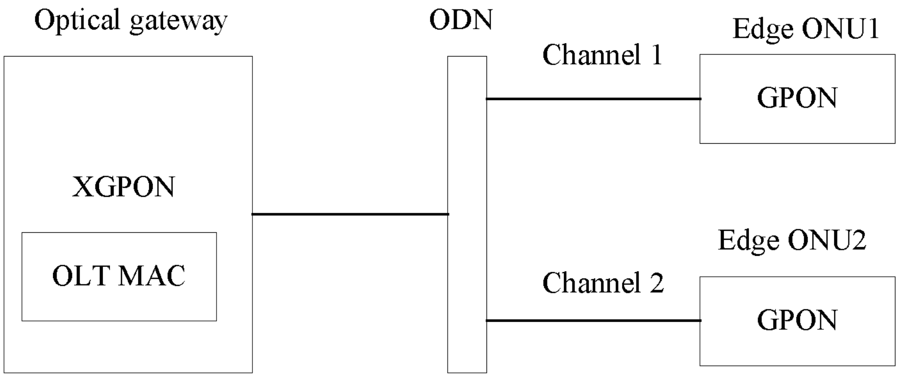
FIG. 3 is a schematic diagram of a 10 Gigabit Passive Optical Network (XGPON)-attached ONU system according to some embodiments of the present disclosure.

FIG. 3 is a schematic diagram of a 10 Gigabit Passive Optical Network (XGPON)-attached ONU system according to some embodiments of the present disclosure. As shown in FIG. 3, GPON ONUs are cascaded (attached) under the XGPON ONU. The edge ONUs typically are GPON ONUs. In a GPON system, there are a total of 4096 Gemports, represented by Gemport 0-4095, serving as service channels. On the FTTR optical gateway, 4096 Gemports are created, each corresponding to a service Gemport of the edge ONU in a one-to-one correspondence. In this way, when the FTTR optical gateway receives a data packet from a specific Gemport of the edge ONU, the FTTR optical gateway learns a source MAC address and the Gemport and records the same to the MAC address table for subsequent MAC address searching and forwarding. For a data packet that needs to be forwarded to a certain Gemport, G-PON Encapsulation Mode (GEM) frame encapsulation will also be carried out according to a Gemport number and the encapsulated GEM frame will be sent to the edge ONU. In the embodiments of this disclosure, the data exchange of the optical gateway mainly includes system initialization, hardware data exchange, software data exchange, and the aging of the MAC address table.

Figure 4:
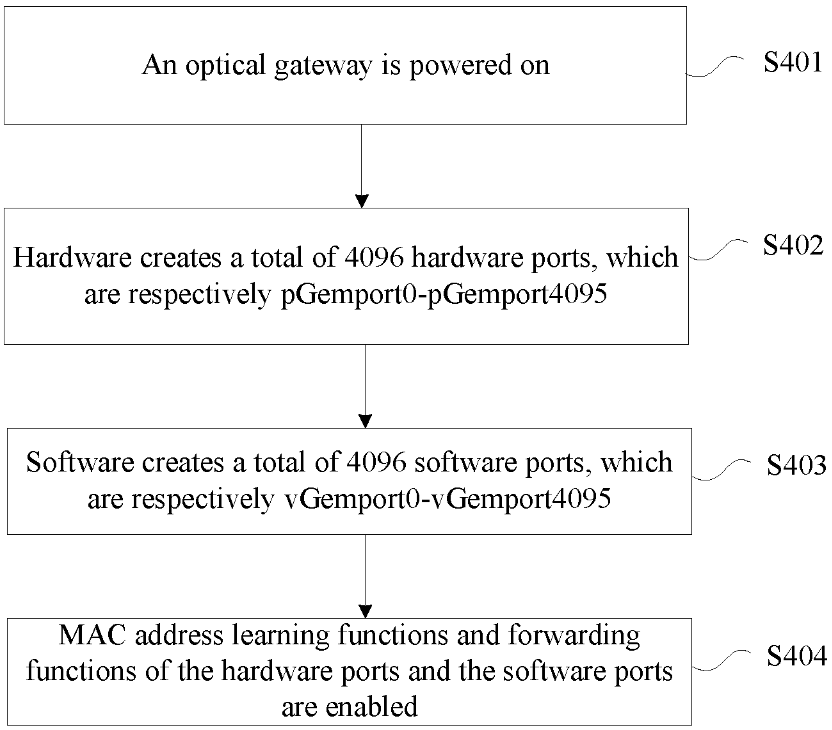
FIG. 4 is a flowchart of system initialization according to some embodiments of the present disclosure.

For example, the system initialization includes: after the optical gateway is powered on, first, hardware creates 4096 physical ports, which are named pGemport0-pGemport4095. Then software creates 4096 software ports, named vGemport0-vGemport4095. After both the software ports and the hardware ports are created, packet receiving functions and MAC address learning and forwarding functions of the hardware ports and the software ports are enabled. Before the system initialization is completed, neither the hardware ports nor the software ports can receive the packets, nor can they learn the MAC address and forward the packets. FIG. 4 is a flowchart of system initialization according to some embodiments of the present disclosure. As shown in FIG. 4, the system initialization may specifically include the following operations S401 to S404.

In operation S401, an optical gateway is powered on.

In operation S402, hardware creates a total of 4096 hardware ports, which are respectively pGemport0-pGemport4095.

In operation S403, software creates a total of 4096 software ports, which are respectively vGemport0-vGemport4095.

There is no fixed sequence between the operation S402 and the operation S403, for example, the operation S402 may be executed first, or the operation S403 may be executed first.

In operation S404, MAC address learning functions and forwarding functions of the hardware ports and the software ports are enabled.

Figure 5:
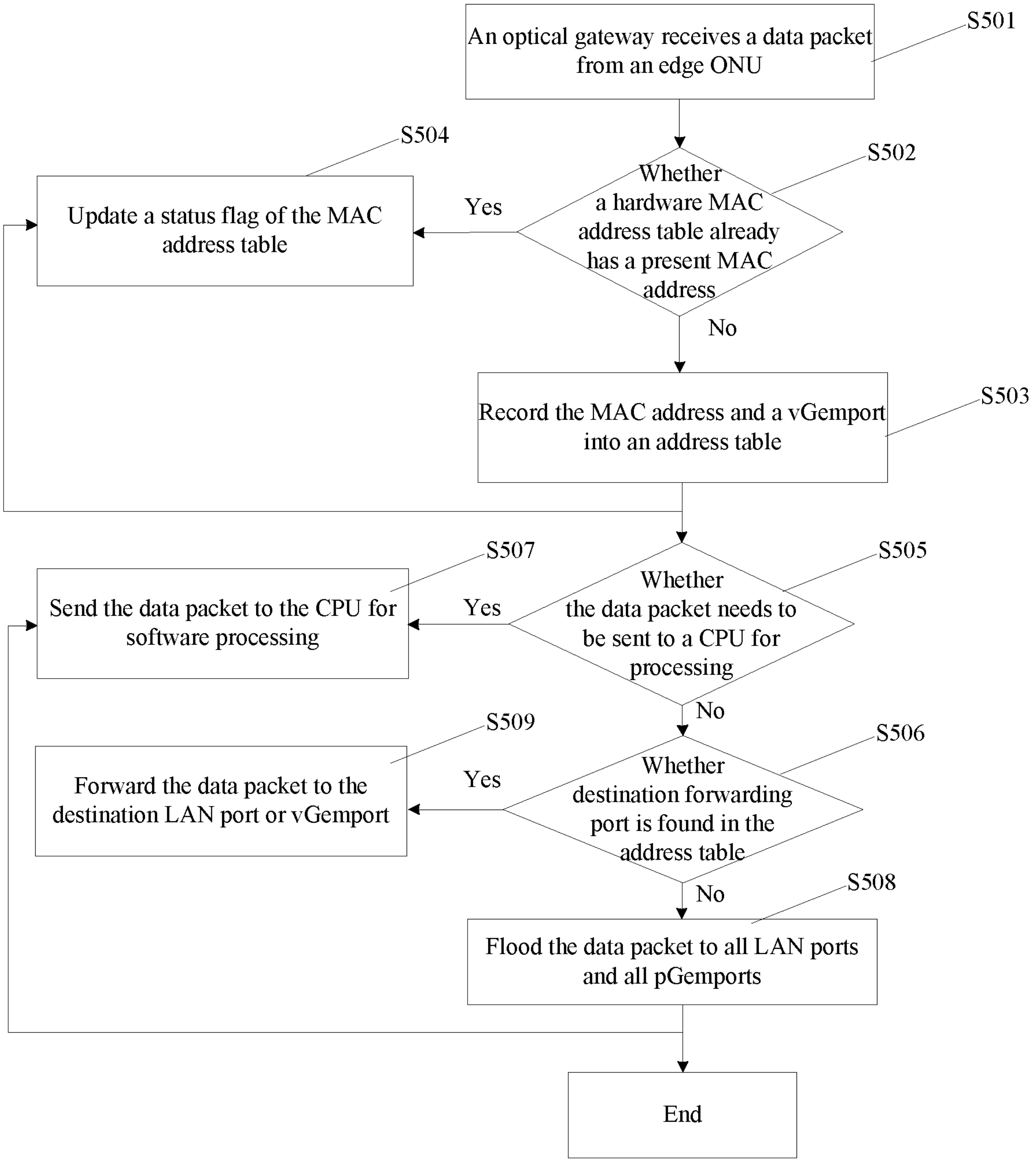
FIG. 5 is a flowchart of hardware data exchange in an FTTR scenario according to some embodiments of the present disclosure.

In the forwarding of hardware data exchange, when receiving a data stream from an edge ONU, hardware of an optical gateway learns a source MAC address of the data stream and a Gemport corresponding to the data stream into a hardware MAC address table, so as to form an address entry containing a source MAC address+a pGemport physical port. For a data stream from an LAN port and a PON port of the optical gateway, the source MAC of the data stream and the corresponding port of the data stream are also learned into the hardware MAC address table. In this way, MAC address-based hardware packet exchange can be implemented on the optical gateway. For a packet that needs to be forwarded to a certain pGemport, a corresponding Gemport value needs to be added, and GEM frame encapsulation is performed and then the encapsulated GEM frame is sent to a corresponding edge ONU. FIG. 5 is a flowchart of hardware data exchange in an FTTR scenario according to some embodiments of the present disclosure. As shown in FIG. 5, the hardware data exchange includes the following operations S501 to S509.

In operation S501, an optical gateway receives a data packet from an edge ONU.

In operation S502, the optical gateway extracts a source MAC address of the data packet, and judges whether a hardware MAC address table already has the present MAC address.

In operation S503, in a case where the MAC address does not exist in the hardware MAC address table, the optical gateway learns the MAC address and a pGemport at which the data packet is received into the hardware MAC address table.

In operation S504, the optical gateway updates a status flag of the hardware MAC address table. In a case where the present MAC address entry already exists in the hardware MAC address table, the optical gateway updates status information of the present MAC address entry to indicate that the present MAC address entry is in use, and such status information will be used as a reference during an address ageing process.

In operation S505, the optical gateway judges whether the data packet needs to be sent to a Central Processing Unit (CPU) for software processing.

In operation S506, in a case where the data packet does not need to be sent to the CPU for software processing, then the optical gateway directly searches in the hardware MAC address table for a destination forwarding port.

In operation S507, the data packet is sent to the CPU for software processing.

In operation S508, in a case where the destination forwarding port is not found in the hardware MAC address table, the data packet is flooded on all LAN ports and all pGemports.

In operation S509, after the destination forwarding port is found in the hardware MAC address table, the data packet is forwarded to the destination forwarding port (which may be a LAN port or a pGemport).

In the forwarding of software data exchange, in addition to being directly forwarded by hardware, some packets further need to be processed by software of an optical gateway. Correspondingly, when the data packet from the edge ONU is sent to the optical gateway through the pGemport for software processing, the data packet enters the corresponding vGemport, and then the software of the optical gateway learns the source MAC address of the packet and the corresponding vGemport to a software MAC address table. For the data streams from the LAN port and the PON port of the optical gateway, the source MAC address of the data stream and the corresponding port are also learned into the software MAC address table. In this way, MAC address-based software message exchange can be implemented. For a data packet that needs to be forwarded to a certain vGemport, the data packet is first sent to a corresponding pGemport, then GEM frame encapsulation is performed and then the encapsulated GEM frame is sent to a corresponding edge ONU. FIG. 6 is a flowchart of software data exchange in an FTTR scenario according to some embodiments of the present disclosure. As shown in FIG. 6, the software data exchange includes the following operations S601 to S607.

In operation S601, an optical gateway receives a data packet from an edge ONU.

In operation S602, the optical gateway extracts a source MAC of the data packet, and judges whether the present MAC address exists in a software MAC address table.

In operation S603, in a case where the present MAC address exists in the software MAC address table, the optical gateway learns the MAC address and a vGemport at which the data packet is received into the software MAC address table.

In operation S604, the optical gateway updates a status flag of the software MAC address table. In a case where the present MAC address entry already exists in the software MAC address table, then the optical gateway updates status information of the present MAC address entry to indicate that the present MAC address entry is in use, and such status information will be used as a reference during an address ageing process.

In operation S605, the optical gateway searches in the software MAC address table to acquire a destination forwarding port.

In operation S606, in a case where the destination forwarding port is not found in the software MAC address table, the data packet is flooded on all LAN ports and all vGemports.

In operation S607, after the destination forwarding port is found in the software MAC address table, the data packet is forwarded to the destination forwarding port (which may be a LAN port or a vGemport).

In order to achieve the ageing of the hardware MAC address table and the software MAC address table, the MAC addresses learned on the hardware and software of the optical gateway need to support the ageing mechanism. Within a certain period of time (for example, 5 minutes, the value is configurable), if no packet corresponding to the MAC address is transmitted, the corresponding MAC address needs to be aged automatically.

The embodiments of the present disclosure adopt the original MAC address switching model without modifying the optical gateway switching model. Furthermore, there is no need to modify the content of the packet, the implementation is simple, no additional bandwidth is occupied, and the bandwidth utilization rate can be improved. In addition, if an ONU such as an EPON, an XGPON, an XGEPON or a 50G PON is used as the edge ONU, it is also convenient to implement extension according to the range of the service Gemport of the edge ONU.

According to another embodiment of the present disclosure, also provided is a data packet forwarding apparatus, which is applied to an optical gateway. FIG. 7 is a block diagram of a data packet forwarding apparatus according to some embodiments of the present disclosure. As shown in FIG. 7, the data packet forwarding apparatus includes:

a receiving module 72, configured to receive, through a Gemport in one-to-one correspondence with a service Gemport of a first edge Optical Network Unit (ONU), a data packet sent by the first edge ONU;

a searching module 74, configured to search for a destination forwarding port from a Media Access Control (MAC) address table according to a destination MAC address of the data packet, wherein the MAC address table stores a correspondence between a source MAC address and a Gemport; and a sending module 76, configured to send the data packet to a second edge ONU through the destination forwarding port in a case where the destination forwarding port is found.

In an embodiment, the searching module 74 is further configured to:

in a case of performing hardware processing on the data packet, search for the destination forwarding port from a hardware MAC address table according to the destination MAC address of the data packet, wherein the hardware MAC address table stores a correspondence between the source MAC address and a pGemport; or in a case of performing software processing on the data packet, search for the destination forwarding port from a software MAC address table according to the destination MAC address of the data packet, wherein the software MAC address table stores a correspondence between the source MAC address and a vGemport.

In an embodiment, the data packet forwarding apparatus further includes:

a flooding module, configured to flood the data packet to all Local Area Network (LAN) ports and all Gemports in a case where the destination forwarding port is not found.

In some embodiments of the present disclosure, the flooding module is further configured to, in a case of performing hardware processing on the data packet, send the data packet to all the LAN ports and all the Gemports; or in a case of performing software processing on the data packet, flood the data packet on all the LAN ports and all vGemports.

In an embodiment, the data packet forwarding apparatus further includes:

an extracting module, configured to extract a source MAC address of the data packet;

a judging module, configured to judge whether the source MAC address exists in the MAC address table; and a storing module, configured to, in a case where the source MAC address does not exist in the MAC address table, store a correspondence between the source MAC address and the Gemport into the MAC address table.

In an embodiment, the data packet forwarding apparatus further includes:

an updating module, configured to, in a case where the source MAC address exists in the MAC address table, update status information of an entry that contains the source MAC address.

In an embodiment, the data packet forwarding apparatus further includes:

an aging processing module, configured to perform aging processing on the entry that contains the source MAC address according to the status information in the MAC address table at a preset time period.

In an embodiment, the data packet forwarding apparatus further includes:

a creating module, configured to create, after being powered on, software ports and hardware ports;

an enabling module, configured to enable packet receiving functions and MAC address learning and forwarding functions of the software port and the hardware port, so as to complete system initialization.

The embodiments of the present disclosure also provide a computer readable storage medium. The computer readable storage medium stores a computer program, and the computer program, when running on a processor, causes the processor to execute the operations in any one of the described method embodiments.

In an exemplary embodiment, the computer readable storage medium may include, but is not limited to, any medium that can store a computer program, such as a Universal Serial Bus (USB) flash drive, a Read-Only Memory (ROM), a Random Access Memory (RAM), a removable hard disk, a magnetic disk, or an optical disc.

The embodiments of the present disclosure further provide an electronic device, including a memory and a processor, wherein the memory stores a computer program, and the processor is configured to run the computer program so as to execute the operations in any one of the method embodiments.

In an exemplary embodiment, the electronic device may further include a transmission device and an input/output device, wherein the transmission device is connected to the processor, and the input/output device is connected to the processor.

For specific examples in this embodiment, reference may be made to the examples described in the foregoing embodiments and exemplary embodiments, and details are not repeatedly described in this embodiment.

Obviously, those having ordinary skill in the art should understand that each module or each operation of the present disclosure may be implemented by a universal computing device, and the modules or operations may be concentrated on a single computing device or distributed on a network formed by multiple computing devices, and may be implemented by program codes executable for the computing devices, so that the modules or operations may be stored in a storage device for execution with the computing devices. The shown or described operations may be executed in sequences different from those described here in some cases, or may form each integrated circuit module respectively, or multiple modules or operations therein may form a single integrated circuit module for implementation. As such, the present disclosure is not limited to any particular hardware and software combination.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

The invention claimed is:

1. A data packet forwarding method, which is applied to an optical gateway, comprising:

receiving, through a Gemport in one-to-one correspondence with a service Gemport of a first edge Optical Network Unit (ONU), a data packet sent by the first edge ONU;

searching for a destination forwarding port from a Media Access Control (MAC) address table according to a destination MAC address of the data packet, wherein the MAC address table stores a correspondence between a source MAC address and a Gemport; and in a case where the destination forwarding port is found, sending the data packet to a second edge ONU through the destination forwarding port.

2. The data packet forwarding method according to claim 1, wherein the searching for a destination forwarding port from a MAC address table according to a destination MAC address of the data packet comprises:

in a case of performing hardware processing on the data packet, searching for the destination forwarding port from a hardware MAC address table according to the destination MAC address of the data packet, wherein the hardware MAC address table stores a correspondence between the source MAC address and a pGemport.

3. The data packet forwarding method according to claim 1, further comprising:

in a case where the destination forwarding port is not found, sending the data packet to all Local Area Network (LAN) ports and all Gemports.

4. The data packet forwarding method according to claim 3, wherein the sending the data packet to all Local Area Network (LAN) ports and all Gemports comprises:

flooding the data packet on all the LAN ports and all the Gemports.

5. The data packet forwarding method according to claim 1, wherein after the receiving, through a Gemport in one-to-one correspondence with a service Gemport of a first edge ONU, a data packet sent by the first edge ONU, the data packet forwarding method further comprises:

extracting a source MAC address of the data packet;

judging whether the source MAC address exists in the MAC address table; and in a case where the source MAC address does not exist in the MAC address table, storing a correspondence between the source MAC address and the Gemport into the MAC address table.

6. The data packet forwarding method according to claim 5, further comprising:

in a case where the source MAC address exists in the MAC address table, updating status information of an entry that contains the source MAC address.

7. The data packet forwarding method according to claim 6, further comprising:

performing aging processing on the entry that contains the source MAC address according to the status information in the MAC address table at a preset time period.

8. The data packet forwarding method according to claim 1, wherein before the receiving, through a Gemport in one-to-one correspondence with a service Gemport of a first edge ONU, a data packet sent by the first edge ONU, the data packet forwarding method further comprises:

after being powered on, creating software ports and hardware ports; and enabling packet receiving functions and MAC address learning and forwarding functions of the software port and the hardware port, so as to complete system initialization.

9. A non-transitory computer readable storage medium, wherein the computer readable storage medium stores a computer program, and the computer program, when running on a processor, causes the processor to execute operations comprising:

receiving, through a Gemport in one-to-one correspondence with a service Gemport of a first edge Optical Network Unit (ONU), a data packet sent by the first edge ONU;

searching for a destination forwarding port from a Media Access Control (MAC) address table according to a destination MAC address of the data packet, wherein the MAC address table stores a correspondence between a source MAC address and a Gemport; and in a case where the destination forwarding port is found, sending the data packet to a second edge ONU through the destination forwarding port.

10. An electronic device, comprising a memory and a processor, wherein the memory stores a computer program, and the processor is configured to run the computer program so as to execute operations comprising:

receiving, through a Gemport in one-to-one correspondence with a service Gemport of a first edge Optical Network Unit (ONU), a data packet sent by the first edge ONU;

searching for a destination forwarding port from a Media Access Control (MAC) address table according to a destination MAC address of the data packet, wherein the MAC address table stores a correspondence between a source MAC address and a Gemport; and in a case where the destination forwarding port is found, sending the data packet to a second edge ONU through the destination forwarding port.

11. The data packet forwarding method according to claim 1, wherein the searching for a destination forwarding port from a MAC address table according to a destination MAC address of the data packet comprises:

in a case of performing software processing on the data packet, searching for the destination forwarding port from a software MAC address table according to the destination MAC address of the data packet, wherein the software MAC address table stores a correspondence between the source MAC address and a vGemport.

12. The data packet forwarding method according to claim 4, wherein the flooding the data packet on all the LAN ports and all the Gemports comprises:

in a case of performing hardware processing on the data packet, sending the data packet to all the LAN ports and all the Gemports.

13. The data packet forwarding method according to claim 4, wherein the flooding the data packet on all the LAN ports and all the Gemports comprises:

in a case of performing software processing on the data packet, flooding the data packet on all the LAN ports and all vGemports.

14. The electronic device according to claim 10, wherein the searching for a destination forwarding port from a MAC address table according to a destination MAC address of the data packet comprises:

in a case of performing hardware processing on the data packet, searching for the destination forwarding port from a hardware MAC address table according to the destination MAC address of the data packet, wherein the hardware MAC address table stores a correspondence between the source MAC address and a pGemport.

15. The electronic device according to claim 10, wherein the searching for a destination forwarding port from a MAC address table according to a destination MAC address of the data packet comprises:

in a case of performing software processing on the data packet, searching for the destination forwarding port from a software MAC address table according to the destination MAC address of the data packet, wherein the software MAC address table stores a correspondence between the source MAC address and a vGemport.

16. The electronic device according to claim 10, wherein the processor is configured to run the computer program so as to execute operations further comprising in a case where the destination forwarding port is not found, sending the data packet to all Local Area Network (LAN) ports and all Gemports.

17. The electronic device according to claim 10, wherein the processor is configured to run the computer program so as to execute the following operations after the receiving, through a Gemport in one-to-one correspondence with a service Gemport of a first edge ONU, a data packet sent by the first edge ONU:

extracting a source MAC address of the data packet;

judging whether the source MAC address exists in the MAC address table; and in a case where the source MAC address does not exist in the MAC address table, storing a correspondence between the source MAC address and the Gemport into the MAC address table.

18. The electronic device according to claim 17, wherein the processor is configured to run the computer program so as to execute operations further comprising:

in a case where the source MAC address exists in the MAC address table, updating status information of an entry that contains the source MAC address.

19. The electronic device according to claim 18, wherein the processor is configured to run the computer program so as to execute operations further comprising:

performing aging processing on the entry that contains the source MAC address according to the status information in the MAC address table at a preset time period.

20. The electronic device according to claim 10, wherein the processor is configured to run the computer program so as to execute the following operations before the receiving, through a Gemport in one-to-one correspondence with a service Gemport of a first edge ONU, a data packet sent by the first edge ONU:

after being powered on, creating software ports and hardware ports; and enabling packet receiving functions and MAC address learning and forwarding functions of the software port and the hardware port, so as to complete system initialization.

* * * * *